United States Patent [19]

Himeno et al.

[11] Patent Number: 5,734,028
[45] Date of Patent: Mar. 31, 1998

[54] BLUE TYPE DISPERSE DYE MIXTURE

[75] Inventors: Kiyoshi Himeno; Toshio Hihara; Ryouchi Sekioka, all of Kitakyushu, Japan

[73] Assignee: DyStar Japan Ltd., Osaka, Japan

[21] Appl. No.: 732,723

[22] Filed: Oct. 18, 1996

[30] Foreign Application Priority Data

Oct. 30, 1995 [JP] Japan ................... 7-303313

[51] Int. Cl.$^6$ ............... C09B 67/22; D06P 3/54
[52] U.S. Cl. ................ 534/573; 534/DIG. 1; 8/639; 8/643
[58] Field of Search ............... 534/573, DIG. 1; 8/640, 639, 643

[56] References Cited

U.S. PATENT DOCUMENTS 5,382,263  1/1995  Degen et al. ................... 8/638
5,595,575  1/1997  Himeno et al. ................. 8/639

FOREIGN PATENT DOCUMENTS 673977  9/1995  European Pat. Off. .

OTHER PUBLICATIONS

Chemical Abstracts, 101:212659 (1984).

*Primary Examiner*—Fiona T. Powers
*Attorney, Agent, or Firm*—Oblon, Spivak, McClelland, Maier, & Neustadt, P.C.

[57] ABSTRACT

A blue type disperse dye mixture comprising a monoazo dye of the formula (1) in an amount of 1.0 part by weight and at least one of anthraquinone dyes of the formulae (2) to (4) in a total amount of from 0.2 to 3.0 parts by weight:

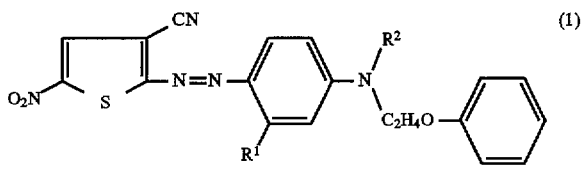

(1)

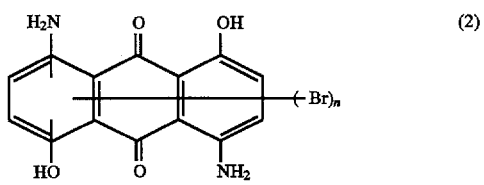

(2)

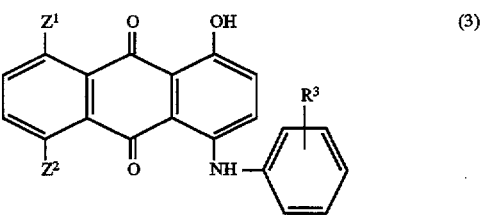

(3)

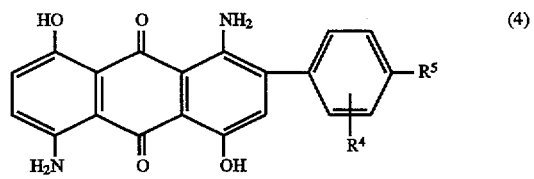

(4)

7 Claims, No Drawings

BLUE TYPE DISPERSE DYE MIXTURE

The present invention relates to a blue type disperse dye mixture. Particularly, the present invention relates to a blue type disperse dye mixture having a certain specific monoazo dye and at least one certain specific anthraquinone dye mixed in a specific ratio.

As a dye to be used for dyeing polyester fibers with a blue color, a monoazo dye of the following formula (1) is, for example, known. This dye is excellent in washing fastness, and its build up property is relatively good, for example, under a condition of 130° C. for 90 minutes, but inadequate in short-time dyeing, for example, under a condition of 130° C. for 30 minutes, and its leveling property is also unsatisfactory.

On the other hand, an anthraquinone dye of the following formula (2), (3) or (4) is excellent in the leveling property, but poor in washing fastness, and its build up property is also inadequate in short-time dyeing.

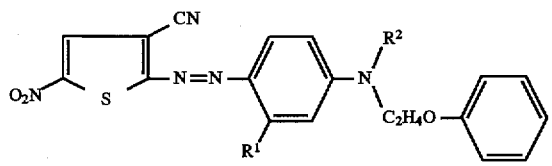
(1)

wherein $R^1$ is a hydrogen atom or a methyl group, and $R^2$ is a $C_{1-5}$ alkyl group or an allyl group;

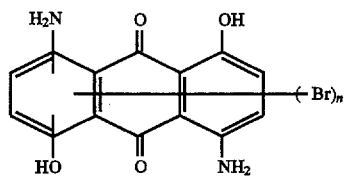
(2)

wherein n is 1 or 2;

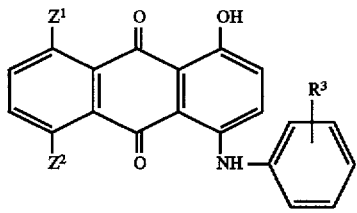
(3)

wherein $R^3$ is a hydrogen atom, a halogen atom or a hydroxyethyl group, and each of $Z^1$ and $Z^2$ which are different from each other, is a hydroxyl group or a nitro group;

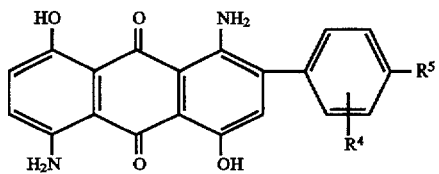
(4)

wherein $R^4$ is a hydrogen atom, a methyl group or an ethyl group, and $R^5$ is a hydroxyl group, a methoxy group or an ethoxy group.

For dyeing polyester fibers, a dye which is excellent in the leveling property and build-up property and which is useful for short-time dyeing, is desired particularly in the field of dyeing with a medium to deep color. The present inventors have conducted extensive studies for the purpose of developing a dye which satisfies such a demand and which has no practical problem with respect to washing fastness, and as a result, the present invention has been accomplished.

The present invention provides a blue type disperse dye mixture comprising a monoazo dye of the above formula (1) in an amount of 1.0 part by weight and at least one of anthraquinone dyes of the above formulas (2) to (4) in a total amount of from 0.2 to 3.0 parts by weight.

Now, the present invention will be described in detail with reference to the preferred embodiments.

In the monoazo dye of the above formula (1) of the present invention, the $C_{1-5}$ alkyl group for $R^2$ may, for example, be a methyl group, an ethyl group, a n-propyl group, an i-propyl group, a n-butyl group, a sec-butyl group, a n-pentyl group or an i-pentyl group. Particularly preferred is an ethyl group or a n-propyl group.

In the anthraquinone dye of the formula (3), the halogen atom for $R^3$ is preferably a chlorine atom or a bromine atom. Particularly preferred is a chlorine atom.

As the monoazo dye of the formula (1), a dye wherein $R^1$ is a hydrogen atom, $R^2$ is an ethyl group or a n-propyl group, is preferred. As the anthraquinone dye of the formula (3) to be mixed therewith, a dye wherein $R^3$ is a chlorine atom is preferred. Likewise, as the anthraquinone dye of the formula (4), a dye wherein $R^4$ is a hydrogen atom, and $R^5$ is a hydroxyl group or a methoxy group, is preferred.

Each of the dyes of the formulae (1) to (4) to be mixed, may consist of a single dye or a plurality of dyes of each formula.

The blend ratio is such that at least one of the anthraquinone dyes of the formulae (2) to (4) is in a total amount of from 0.2 to 3.0 parts by weight, preferred from 0.4 to 2.0 parts by weight, more preferably from 0.6 to 1.8 parts by weight, to 1.0 part by weight of the monoazo dye of the formula (1). Particularly preferred is a dye mixture comprising the dye of the formula (1) in an amount of 1.0 part by weight, and the dyes of the formulae (3) and/or (4), preferably the dye of the formula (4), in an amount of from 0.6 to 1.8 parts by weight, since such a dye mixture is excellent also in sublimination fastness and light-fastness.

Further, other blue dyes may be incorporated in a proportion of not higher than 10 wt %, as the case requires, and to obtain a desired color, a yellow dye or a red dye may be incorporated.

The dyes of the above formulae (1) to (4) are produced in accordance with conventional methods.

The dye mixture of the present invention is capable of dyeing polyester fibers made of e.g. polyethylene terephthalate, polybutylene terephthalate or a polycondensation product of terephthalic acid with 1,4-bis-(hydroxymethyl)cyclohexane, with a blue color with an excellent leveling property, particularly covering property, in a short time. The object to be dyed may be in the form of yarns, knitted fabrics or woven fabrics made of polyester fibers or a mixed fiber product of the above polyester fibers with other fibers such as cotton, silk, wool, rayon, acetate, polyamide, polyurethane, etc. As a method of dyeing e.g. polyester fibers by means of the dye mixture of the present invention, the dyes of the above formulae (1) to (4), may be dispersed in an aqueous medium by using, as a dispersant, a condensation product of naphthalene sulfonic acid with formaldehyde, a higher alcohol sulfuric acid ester or a higher alkyl benzene sulfonate to obtain a dyeing bath or a printing paste, and the fibers can be dyed by dip dyeing or printing.

The dye mixture of the present invention is useful for dip dyeing, printing or padding. When applied to a dip dyeing method, the dye mixture of the present invention exhibits particularly excellent level dyeing and build up properties, and short-time dyeing is possible. As the dip dyeing method, a common dyeing method such as a high temperature dyeing method or a thermosol dyeing method, may be used. In such a case, it is possible to obtain better results by an addition of an acidic substance such as formic acid, acetic acid, phosphoric acid or ammonium sulfate to the dyeing bath. The dyeing conditions are not particularly limited. However, it is preferred to adjust the pH of the dyeing bath to a level within a range of from 4 to 8.5, and the dyeing temperature is usually from 120° to 140° C., and the dyeing time is from 30 to 60 minutes. Further, various leveling agents or ultraviolet absorbers may be incorporated.

Now, the present invention will be described in further detail with reference to Examples. However, it should be understood that the present invention is by no means restricted by such specific Examples.

EXAMPLE 1

160 g of a naphthalene sulfonic acid-formalin condensation product and 650 g of water were added to a dye mixture comprising 20 g of a dye of the following structural formula (1-1) as the dye of the formula (1) and 20 g of a dye of the following structural formula (4-1) as the dye of the formula (4):

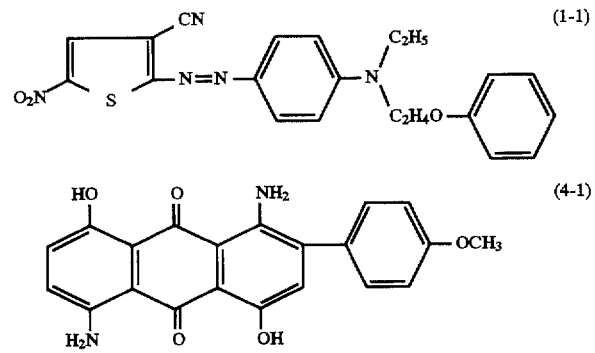

The mixture was subjected to colloid milling by a sand grinder and spray-dried. To each of 0.05 g of and 0.20 g of this powdery dye mixture, 0.08 g of a nonionic leveling agent Diaserver® LP-PSL (manufactured by Mitsubishi Chemical Corporation) and 150 ml of water were added to obtain a dyeing bath, which was adjusted to pH 4.5 with an acetic acid/sodium acetate system or a potassium dihydrogen phosphate/sodium dihydrogen phosphate system. In this dyeing bath, 5 g of a polyester cloth was immersed, and the temperature of the dyeing bath was raised from room temperature at a rate of 2° C./min, and an exhaustion dyeing was carried out under three different conditions i.e. at 120° C. for 60 minutes, at 130° C. for 60 minutes, and at 130° C. for 20 minutes, followed by soaping, washing with water and drying to obtain a dye product of a relatively brilliant blue.

With respect to the dyed cloth, the build up property, the temperature dependency, the dyeing speed and the leveling property (the covering property) were evaluated in accordance with the following methods. The results are shown in Table 1.

Build up property:

The dyeing depth of the dyed cloth which was dyed at 130° C. for 60 minutes by using 0.05 g of the dye mixture, was rated to be 100, and the dyeing depth of the dyed cloth which was dyed under the same conditions by using 0.20 g of the dye mixture, was represented by a relative value. The dyeing depth was obtained as a K/S value from the reflectance of the dyed product measured by a color difference meter (Macbeth® Spectrometer, MS-2020, manufactured by Macbeth Company).

Temperature dependency:

The dyeing depth of the dyed cloth which was dyed by using 0.20 g of the dye mixture at 130° C. for 60 minutes, was rated to be 100, and the dyeing depth of the dyed cloth which was dyed by using the same amount of the dye mixture at 120° C. for 60 minutes, was represented by a relative value.

Dyeing speed:

The dyeing depth of the dyed cloth which was dyed at 130° C. for 60 minutes by using 0.20 g of the dye mixture, was rated to be 100, and the dyeing depth of the dyed cloth which was dyed at 130° C. for 20 minutes by using the same amount of the dye mixture, was represented by a relative value.

Leveling property (covering property):

5 g of a polyester cloth for a covering test prepared by weaving two types of polyester yarns differing in preheat set to have alternate stripe patterns with a width of about 0.5 cm, was dyed by using 0.05 g of the dye mixture at 130° C. for 60 minutes at pH 4.5, and the dyeing properties of the two types of polyester yarns of the dyed cloth were evaluated by a gray scale. When a dye excellent in the leveling property is employed, the difference in the dyeing properties of the two is small, and the dyed cloth looks as uniformly dyed.

COMPARATIVE EXAMPLE 1

Dyeing was carried out in the same manner as in Example 1 except that in Example 1, the dye of the structural formula (1-1) was solely used in an amount of 30 g, and the amount of the naphthalene sulfonic acid-formalin condensation product was changed to 170 g. The results are shown in Table 1.

The dyeing strength of the dye of the structural formula (1-1) is about twice that of the dye of the structural formula (4-1) per unit weight, and the above amount provides a dyeing depth substantially equal to the dyeing depth in Example 1.

COMPARATIVE EXAMPLE 2

Dyeing was carried out in the same manner as in Example 1 except that in Example 1, the dye of the structural formula (4-1) was solely used in an amount of 60 g, and the amount of the naphthalene sulfonic acid-formalin condensation product was changed to 120 g. The results are shown in Table 1.

EXAMPLES 2 AND 3

Dyeing was carried out in the same manner as in Example 1 except that in Example 1, the dyes of the structural formulae (1-1) and (4-1) were used in the respective amounts as identified in Table 1. The results are shown in Table 1.

TABLE 1

| | | Amount of Dyes (g) | | Build up property *1 | Temperature dependency *2 | Dyeing speed *3 | Leveling property *4 (Covering property) |
|---|---|---|---|---|---|---|---|
| | | (1-1) | (4-1) | | | | |
| Examples | 1 | 20 | 20 | 365 | 91 | 82 | 4 |
| | 2 | 16 | 28 | 380 | 93 | 87 | 4+ |
| | 3 | 25 | 10 | 350 | 89 | 80 | 4− |
| Comparative Examples | 1 | 30 | — | 305 | 69 | 35 | 3 |
| | 2 | — | 60 | 280 | 65 | 45 | 4–5 |

Ideal values
*1: 400
*2: 100
*3: 100
*4: 5

EXAMPLES 4 TO 8

Dyeing was carried out in the same manner as in Example 1 by using a dye mixture comprising 20 g of the dye of the structural formula (1-1) as used in Example 1 and 20 g of a dye or dyes as identified in Table 2 instead of the dye of the structural formula (4-1) as used in Example 1. In each Example, the results of evaluation of the dyed cloth were as follows.

Build up property: at least 330

Temperature dependency: at least 85

Dyeing speed: at least 75

Leveling property: at least 4⁻

TABLE 2

Dyes

| Example | Formula | Structure | | | Weight ratio of A:B |
|---|---|---|---|---|---|
| 4 | (4) | [Anthraquinone structure with HO, O, NH$_2$, OH, H$_2$N groups and phenyl-R$^5$ substituent] | A R$^5$ OH<br>B R$^5$ OCH$_3$ | | 1:1 |
| 5 | (3) | [Anthraquinone structure with HO, O, OH, H$_2$N, O, NH-phenyl-C$_2$H$_4$OH] | | | |
| 6 | (2) | [Anthraquinone structure with H$_2$N, O, NH$_2$, HO, O, OH, (Br)n] | A n 1<br>B n 2 | | 8:2 |
| 7 | (3) | [Anthraquinone structure with Z$^1$, O, OH, Z$^2$, O, NH-phenyl] | A Z$^1$ OH<br>  Z$^2$ NO$_2$<br>B Z$^1$ NO$_2$<br>  Z$^2$ OH | | 3:1 |

TABLE 2-continued

| | | Dyes | | Weight ratio of A:B |
|---|---|---|---|---|
| Example | Formula | Structure | | |
| 8 | (4) | [structure: anthraquinone with HO, O, NH$_2$, H$_2$N, O, OH substituents and phenyl ring with R$^4$, R$^5$] | A R$^4$ CH$_3$<br>R$^5$ OH<br>B R$^4$ H<br>R$^5$ OC$_2$H$_5$ | 1:1 |

EXAMPLES 9 TO 13

Dyeing was carried out in the same manner as in Example 1 by using a dye mixture comprising 20 g of a dye as identified in Table 3 as the dye of the formula (1) and 20 g of a dye or dyes as identified in Table 3 as the dyes of the formulae (2) to (4). In each Example, the results of evaluation of the dyed cloth were the same as the dyed cloth in Examples 4 to 8.

As described in the foregoing, the blue type disperse dye mixture of the present invention is excellent in the leveling property (covering property), and its build up property is also excellent, and its washing fastness is at a level where there is no practical problem, whereby short-time dyeing is possible.

What is claimed is:

1. A blue type disperse dye mixture comprising a monoazo dye of the formula (1) in an amount of 1.0 part byweight and at least one of anthraquinone dyes of the formulae (2) to (4) in a total amount of from 0.2 to 3.0 parts by weight:

TABLE 3

Dye (1): [structure with O$_2$N, S, CN, N=N, R$^1$, R$^2$, C$_2$H$_4$O-phenyl]

Dye (2): [anthraquinone structure with H$_2$N, O, OH, HO, O, NH$_2$, (Br)n]

| Example | R$^1$ | R$^2$ | n |
|---|---|---|---|
| 9 | CH$_3$ | CH$_3$ | — |
| 10 | H | C$_3$H$_7$ | — |
| 11 | H | CH$_2$CH=CH$_2$ | 2 |
| 12 | H | C$_5$H$_{11}$ | — |
| 13 | CH$_3$ | C$_4$H$_9$ | — |

Dye (3): [anthraquinone with Z$^1$, O, OH, Z$^2$, O, NH-phenyl with R$^3$]

Dye (4): [anthraquinone with HO, O, NH$_2$, H$_2$N, O, OH, phenyl with R$^4$, R$^5$]

| Example | Z$^1$ | Z$^2$ | R$^3$ *$^1$ | R$^4$ *$^2$ | R$^5$ | Weight ratio of dyes |
|---|---|---|---|---|---|---|
| 9 | OH | NO$_2$ | C$_2$H$_4$OH(4) | H | OC$_2$H$_5$ | (3):(4) = 1:3 |
| 10 | OH | NO$_2$ | Cl(2) | H | OH | (3):(4) = 1:2 |
| 11 | — | — | — | H | OCH$_3$ | (2):(4) = 1:1 |
| 12 | — | — | — | C$_2$H$_5$(3) | OC$_2$H$_5$ | — |
| 13 A | OH | NO$_2$ | C$_2$H$_4$OH(4) | — | — | A:B = 1:1 |
| B | OH | NO$_2$ | Br(3) | — | — | |

Note:
*$^1$,*$^2$: The numeral in ( ) indicates the position of the substituent.

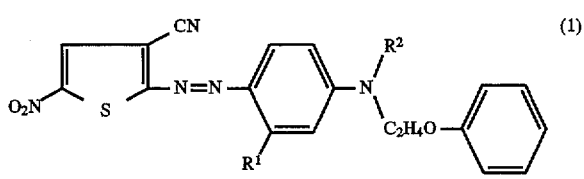
(1)

wherein $R^1$ is a hydrogen atom or a methyl group, and $R^2$ is a $C_{1-5}$ alkyl group or an allyl group;

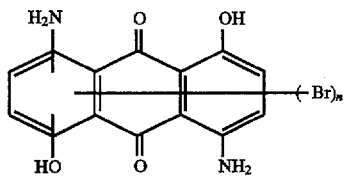
(2)

wherein n is 1 or 2;

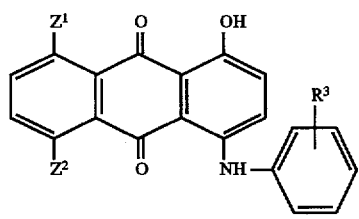
(3)

wherein $R^3$ is a hydrogen atom, a halogen atom or a hydroxy ethyl group, and each of $Z^1$ and $Z^2$ which are different from each other, is a hydroxyl group or a nitro group;

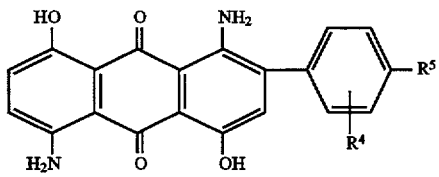
(4)

wherein $R^4$ is a hydrogen atom, a methyl group or an ethyl group, and $R^5$ is a hydroxyl group, a methoxy group or an ethoxy group.

2. The blue type disperse dye mixture according to claim 1, wherein in the formula (1), $R^1$ is hydrogen atom, and $R^2$ is a $C_2$ or $C_3$ alkyl group; in the formula (3), $R^3$ is a hydrogen atom, a chlorine atom or a hydroxyethyl group; and in the formula (4), $R^4$ is a hydrogen atom and $R^5$ is a hydroxyl group or a methoxy group.

3. The blue type disperse dye mixture according to claim 1, which comprises the monoazo dye of the formula (1) in an amount of 1.0 part by weight and at least one of the anthraquinone dyes of the formulae (2) to (4) in a total amount of from 0.4 to 2.0 parts by weight.

4. The blue type disperse dye mixture according to claim 1, which comprises the monoazo dye of the formula (1) in an amount of 1.0 part by weight, and at least one of the anthraquinone dyes of the formulae (2) to (4) in a total amount of from 0.6 to 1.8 parts by weight.

5. The blue type disperse dye mixture according to claim 4, which comprises the monoazo dye of the formula (1), and at least one of the anthraquinone dyes of the formulae (3) and (4).

6. The blue type disperse dye mixture according to claim 5, which comprises the monoazo dye of the formula (1), and the anthraquinone dye of the formula (4).

7. Polyester fibers or polyester fiber-containing products dyed with a disperse dye mixture of claim 1.

* * * * *